United States Patent [19]

Leaf

[11] Patent Number: 5,546,762
[45] Date of Patent: Aug. 20, 1996

[54] CHILL SEPARATION SYSTEM

[76] Inventor: David T. Leaf, 2815 Dalkeith Dr., Richmond, Va. 23233

[21] Appl. No.: 355,235

[22] Filed: Dec. 9, 1994

[51] Int. Cl.$^6$ ........................................... B01D 9/04
[52] U.S. Cl. .............................. 62/532; 62/123
[58] Field of Search ........................ 62/123, 532

[56] References Cited

U.S. PATENT DOCUMENTS

| | | | |
|---|---|---|---|
| 1,494,688 | 5/1924 | Joachim | 62/67 |
| 3,636,722 | 1/1972 | Ganiaris | 62/123 |

*Primary Examiner*—Ronald C. Capossela
*Attorney, Agent, or Firm*—Cushman Darby & Cushman, LLP

[57] ABSTRACT

A method and a system is disclosed in which soluble solids, including soluble animal proteins, dissolved in a solution are separated from the solution by passing the solution through a cooling system in which the solution is cooled to a precipitation temperature at which the soluble solids become precipitatable and then passing the cooled solution into a clarifying system in which the precipitatable soluble solids are separated from the solution thereby creating a separated solids stream and a clarified water stream. Initial cooling of the solution is accomplished by heat exchange between the solution and the separated solids stream and between the solution and the clarified water stream.

13 Claims, 1 Drawing Sheet

CHILL SEPARATION SYSTEM

BACKGROUND OF THE INVENTION

1. Field of the Invention

The present invention relates to treatment and recovery systems for solutions of soluble solids and, in particular, to a system for separating soluble solids, resulting from animal processing, from solutions discharged by the processing facility.

2. Description of the Art

In the animal processing industry solutions containing dissolved soluble animal proteins are an inevitable by-product of the processing operation. A type of solution that is unique to the fish processing industry is known as stickwater. This comprises a mixture of dissolved soluble fish proteins and water. Animal processing facilities are required by environmental and anti-pollution laws to treat solution by-products created during processing operations. In addition, it is often cost efficient to recover the soluble proteins from the solution for later use in a final animal product. This requires, as a first step in the treatment and recovery process, separating soluble solids, such as animal proteins and the like, from the solution resulting from the processing operation.

Presently, the typical method used for accomplishing this soluble solids separation step involves drying the soluble solids laden solution in evaporators. Condensate from the evaporation process is sometimes further treated and is then discharged. The soluble solids left behind will be further processed and/or discarded.

The evaporation method of separating soluble solids from solution, however, has the disadvantages of being very energy intensive and requires a high level of maintenance for the evaporators themselves. Therefore, a need exists to develop a separation process and system which consumes less energy and which is easier and less costly to operate and maintain.

SUMMARY OF THE INVENTION

It is an object of the present invention to provide a process and a system for separating soluble solids from solutions that minimize energy consumption and system maintenance requirements.

In accordance with the present invention then, a method for separating soluble solids from solutions is provided that includes cooling solids laden solution to a precipitation temperature at which the soluble solids become precipitatable. The cooled solution is then passed on to a separator where the precipitatable soluble solids are separated from the solution, thereby creating a first separated solids stream and a second clarified water strem.

Furthermore, the first separated solids stream and the second clarified water stream are each reused to initially cool mew incoming solution by heat exchange between the uncooled new solution supply and the relatively cool first separated solids stream and second clarified water stream.

In addition, a chill separation system is provided that includes a solution transporting system through which solution is moved from a solution source to a sepatation point at which soluble solids are remoned from the solution.

Disposed along the solution transporting system is a solution cooling system, comprising a forced air cooler, various heat exchangers, and a refrigeration system, that cools the solution to a precipitation temperature at which soluble solids dissolved in the solution become precipitatable. At the separation point, a clarifying system is provided in which precipitatable soluble solids are removed from the cooled solution, thereby creation a separated solids stream and clarified water stream.

The separated solids stream passes through a one of the feat exchangers to cool the solution by heat exchange between the solution and the separated solids stream. The clarified water stream passes independintly through another of the heat exchangers to further cool the solution by heat exchange between the solution and the clarified water stream.

Other objects, features, and characteristics of the present invention will become apparent upon consideration of the following description in the appended claims with reference to the accompanying drawing, all of which form a part of the specification, and wherein reference numerals designate corresponding parts of the figure.

DETAILED DESCRIPTION OF THE PREFERRED EXEMPLARY EMBODIMENT

Figure 1:
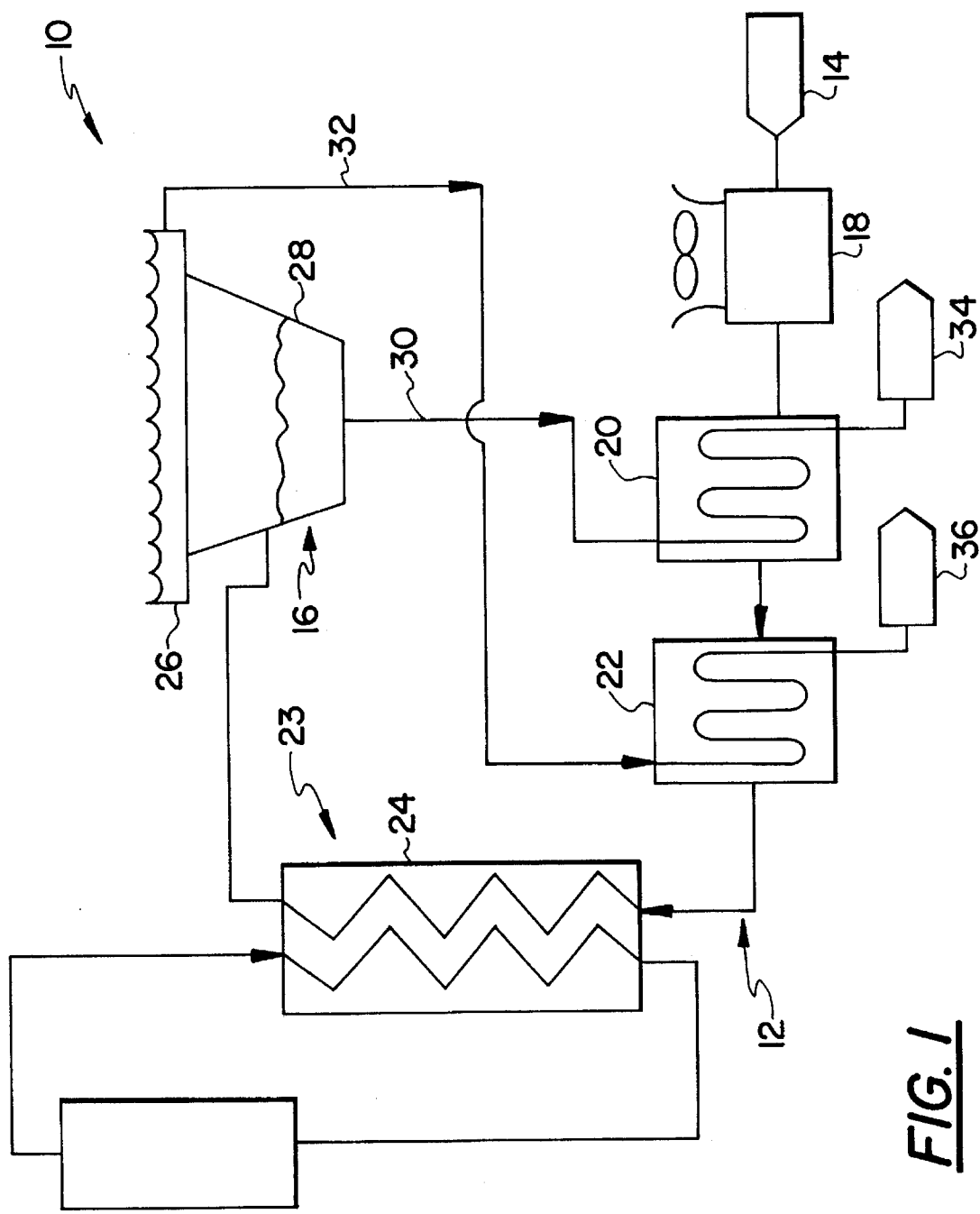
FIG. 1 is a schematic diagram of a chill separation system in accordance with the preferred exemplary embodiment of the present invention.

As shown in FIG. 1, a preferred exemplary embodiment of a chill separation system in accordance with the present invention is designated generally by the reference character 10.

A solution transporting system, generally referenced at 12, includes a conduit for transporting solution from a solution source 14, such as an animal processing facility, to the clarifying system 16 of the chill separation system. The solution transporting system 12 may comprise a pipe system preferably constructed of a corrosion-resistant material such as plastic or stainless steel. The solution transportion system may also include various valves and temperature and folwrate monitors (not shown) that can be used to provide condition data and a continuous monitoring of system operation.

Incoming solution enters the chill separation system 10 from the solution source 14 and is pumped through the solution transporting system by a suitable pump (not shown). The solution such as a forced air cooler. A forced air cooler can provide relatively inexpensive initial cooling of the solution if the ambient temperature within the chill separation system environment is lower than that of the solution. If, however, the ambient temperature of the chill separation system environment is equal to or greater than the temperature of the solution, no initial cooling can be accomplished by a forced air cooler, and consequently, that component may be eliminated from the chill separation system.

The solution next travels through the solution transport system 12 into a first heat exchanger 20. Within the heat exchanger 20, the solution is further cooled in a manner to be described in greater detail below.

From the first heat exchanger 20 the solution flows through the solution transporting system 12 into a second heat exchanger 22 located downstream of the first heat exchanger 20. Still further cooling of the solution is accomplished in the second heat exchanger 22 in a manner to be described in greater detail below.

Although any type of heat exchanger would be adequate for use in the present invention, it is contemplated that plate-type heat exchangers would be most suitable.

From the second heat exchanger 22, the solution passes into a refrigeration system 23, comprising one or more refrigerated coolers 24, located downstream of the first and second heat exchangers 20, 22 respectively. Although a single refrigerated cooler is shown, the refrigeration system may comprise one or more refrigerated coolers through which the solution may pass and thereby be cooled.

In the refrigeration system 23, the solution is cooled to a precipitation temperature, which can vary from about 35° to 40° F., at which the soluble solids dissolved in the solution become precipitatable. The precise precipitation temperature will vary with the type of solids material to be separated from the solution.

The cooled solution continues through the solution transporting system 12 to the clarifying system 16, which comprises one or more separators 26, in which the precipitatable soluble solids precipitate and collect adjacent the bottom of the settling tank 28 from which they can be removed from the solution via line 30. Clarified water will be removed from the upper portion of separator 26 via line 32.

Although a single separator is shown, the clarifying system may comprise a plurality of separators connected in such a manner that incompletely clarified water from a separator may be passed into a subsequent downstream separator to be further clarified. A separator such as that disclosed in U.S. Pat. No. 4,184,955 exemplifies a potentially suitable device for use in the present invention, and its disclosure is hereby incorporated by reference.

A separated solids stream passes from the settling tank 28 through a separated solids line 30, preferably a pipe system constructed of a suitable corrosion-resistant material, under the pressure of a suitable pump (not shown). To efficiently use the cooled temperature of the separated solids stream, the stream is passed through the first heat exchanger 20 in which incoming solution is cooled by heat exchanged between the cool separated solids stream and the warmer new flow of solution. The separated solids stream passes from the first heat exchanger into a component generally designated by reference number 34. This component may comprise dryers, in which the separated solids are further dried, or other post-separation processing devices.

The clarified water stream passes from the separator 26 through a clarified water line 32, preferably a pipe system constructed of a suitable corrosion-resistant material, under the pressure of a suitable pump (not shown). This clarified water stream is also used to cool down the incoming solution being fed through the second heat exchanger 22 in which the new solution is further cooled by heat exchanged between the cooler clarified water stream and the warmer solution. The clarified water stream passes from the second heat exchanger into a water treatment system 36 for final treatment of the clarified water stream and is then discharged or recycled.

While it is possible for the separated solids stream and the clarified water stream to pass through either of the first or second heat exchangers 20, 22, it is preferable for the separated solids stream to pass through the first heat exchanger 20 and the clarified water stream to pass through the second heat exchanger 22. With this preferred arrangement, more heat can be recovered from the warmer solution by the separated solids stream, thereby reducing the amount of heat required by subsequent drying operations in evaporating the remaining liquids from the solids stream.

Various operating parameters of the chill separation system will be determined by the type and volume of solution to be treated. Therefore, the optimum values of certain operating and design parameters such as pipe diameter, solution flow-rate, residence time in each of the cooling devices, type of separator, solution ph and salinity, precise precipitation temperature, etc., can be determined by known principals of materials science and heat transfer. If abnormally hot or cold solution enters the system, the system operating parameters could be adjusted using various valves and temperature and flow-rate monitors. A computer-controlled monitoring and control system may be incorporated into the chill separation system to provide automatic continuous optimization of system operating conditions.

An example of an application of the present invention, not necessarily a preferred embodiment, is as follows. Stickwater enters the chill separation system 10 from a fish processing facility at a rate of about 110,000 lb/hr and a temperature of about 190° F. It enters the air cooler 18 from which, after a sufficient residence time, it is emitted at about 120°F.

The stickwater then enters the first heat exchanger 20, a 30° F. terminal temperature difference heat exchanger. Within the first heat exchanger the stickwater follows a circuitous path to provide sufficient residence time and is emitted at about 95° F. The stickwater thin enters the second heat exchanger 22, also a 30° F. terminal temperature difference heat exchanger. Within the decond heat exchanger the stichwater follows a circuitous path to provide sufficient residence time and is emitted at about 83° F.

The stickwater next enters a refrigeration system 23 with 440 tons cooling capacity and is cooled to about 35° F. From the refrigeration system, the stickwater enters the clarifying system 16 where it is sepatated into the clarified water stream and the separated solids (predominantly soluble fish proteins) stream. The separated solids stream enters the first heat exchanger at a rate of about 55,000 lb/hr and a temperature of about 40° F. and is discharged at about 90° F. into dryers. The clarified water stream enters the second heat exchanger at a rate of about 55,000 lb/hr and a temperature of about 40° F. and is discharged from the second heat exchanger at about 65° F.

It is estimated in the above exemplary application that to separate soluble solids from stickwater by an evaporation method would cost about $210/hr plus miscellaneous power costs. Conversely, separation by use of the present invention operating within the above operation parameters would cost an estimated $32/hr. Thus, it can be seen that the present invention can provide substantial savings in operating casts over prior art separation nethods.

While the invention has been described in connection with what is presently considered to be the most practical and preferred embodiment, it is to be understood that the invention is not to be limited to the disclosed embodiment, but, on the contrary, it is intended to cover various modifications and equivalent arrangements included within the spirit and scope of the appended claims.

Thus, it is to be understood that variations in the particular parameters used in defining the chill separation system can be made without departing from the novel aspects of this invention as defined in the claims.

What is claimed is:

1. A chill separation system for separating soluble solids from a solution comprising:

a solution transporting system through which a solution is moved from a solution source to a separation point at which soluble solids are removed from said solution;

a solution cooling system disposed along said solution transporting system to cool said solution to a precipitation temperature at which soluble solids dissolved in said solution become precipitatable; and a clarifying system located at said separation point of said solution transporting system in which precipitatable soluble solids are removed from the solution thereby creating a separated solids stream and a clarified water stream.

2. The chill separation system of claim 1 in which said solution cooling system comprises:

first and second heat exchangers located in sequential downstream positions relative to said solution source to cool said solution; and a refrigeration system located downstream of said first and second heat exchangers to cool said solution to the precipitation temperature;

and wherein said separated solids stream passes through a one of said first and second heat exchangers to cool said solution by heat exchange between the solution and the separated solids stream and said clarified water stream passes through another of said first and second heat exchangers to cool said solution by heat exchange between the solution and the clarified water stream.

3. The chill separation system of claim 2 wherein said refrigeration system comprises at least one refrigerated cooler.

4. The chill separation system of claim 2 wherein said heat exchangers are plate-type heat exchangers.

5. The chill separation system of claim 2 in which said solution cooling system further comprises a cooling device located upstream of said first and second heat exchangers.

6. The chill separation system of claim 5 in which said cooling device comprises a forced air cooling device.

7. The chill separation system of claim 2 in which said separated solids stream passes through said first heat exchanger and then into a dryer to evaporate any remaining liquid in the separated solids stream, and said clarified water stream passes through said second heat exchanger before exiting the chill separation system.

8. The chill separation system of claim 1 wherein said solution source is an animal processing facility and said soluble solids are soluble animal proteins.

9. A method for separating soluble solids from solution comprising:

cooling a solution containing dissolved soluble solids to a precipitation temperature at which the soluble solids become precipitatable; and separating said precipitatable soluble solids from the solution thereby creating a separated solids stream and a clarified water stream.

10. The method of claim 9 wherein said separated solids stream and said clarified water stream are reused to cool said solution by heat exchange between the solution and the separated solids stream and between the solution and the clarified water stream.

11. The method of claim 9 wherein said separated solids stream is collected for further processing and said clarified water stream is collected for further treatment and is then discharged.

12. The method of claim 10 wherein said separated solids stream is collected for further processing and said clarified water stream is collected for further treatment and is then discharged.

13. The method of claim 9 wherein said soluble solids are soluble animal proteins.

* * * * *